July 9, 1940.　　　L. L. LAWRENCE　　　2,207,015
TRAP CONSTRUCTION
Filed March 29, 1939　　　3 Sheets-Sheet 1

L. L. Lawrence
INVENTOR.

BY
ATTORNEYS.

July 9, 1940.    L. L. LAWRENCE    2,207,015
TRAP CONSTRUCTION
Filed March 29, 1939    3 Sheets-Sheet 2

L. L. Lawrence
INVENTOR.
BY
ATTORNEYS.

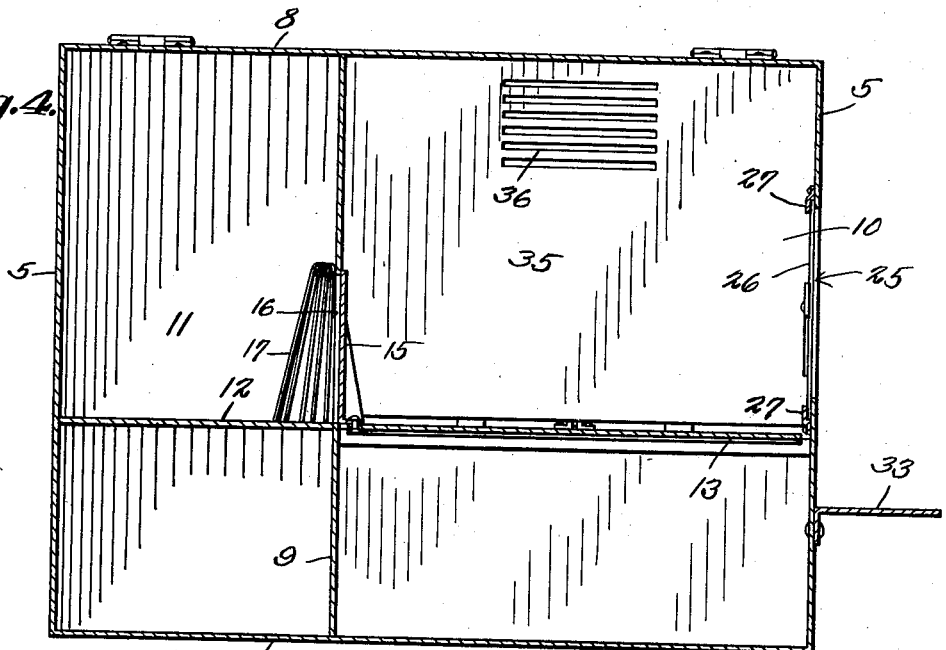

Patented July 9, 1940

2,207,015

UNITED STATES PATENT OFFICE 2,207,015

TRAP CONSTRUCTION

Lynn Lester Lawrence, Julian, Nebr.

Application March 29, 1939, Serial No. 264,816

1 Claim. (Cl. 43—67)

This invention relates to trap construction, and more particularly to traps of the self-set or ever-set type.

The primary object of the invention is to provide a trap in the form of a cage having an entrance opening, and having a retaining section communicating with the main portion of the trap through an opening which is normally closed and concealed from the main portion of the trap.

Another important object of the invention is to provide a trap of this character including a pivoted platform and a movable closure for closing the entrance opening to the main portion of the trap, the platform being operated by the weight of the rodent passing into the trap, thereby preventing the escape of the rodent from the main section of the trap.

A still further object of the invention is to provide a closure for normally closing the opening between the main section of the trap and the retaining section thereof, the closure being moved to its open position so that the rodent may pass into the retaining section of the trap, to prevent the escape of the rodent through the entrance opening of the trap.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 4 is a sectional view taken on line 4—4 of Figure 1.

Figure 5 is a sectional view taken on line 5—5 of Figure 1.

Figure 1:
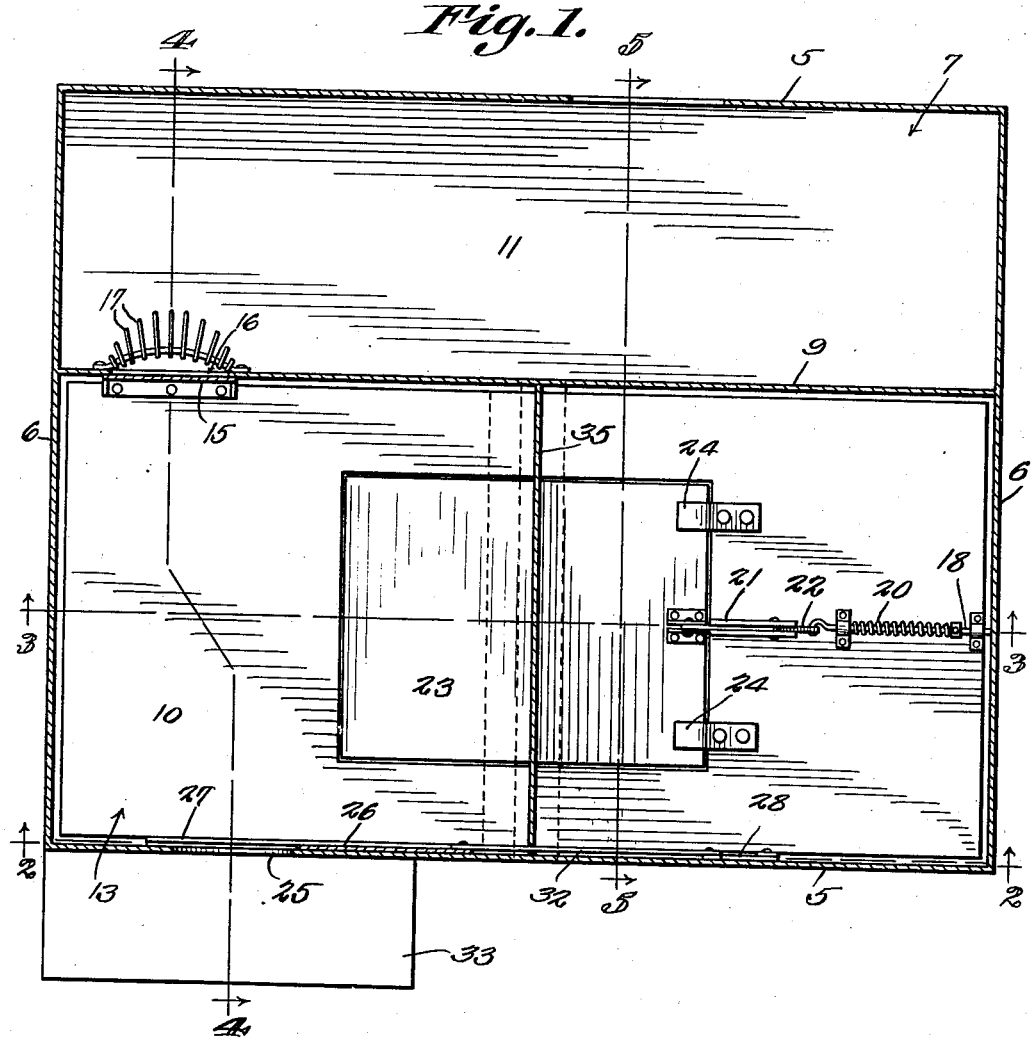
Figure 1 is a sectional view taken on line 1—1 of Figure 2.
Figure 6:
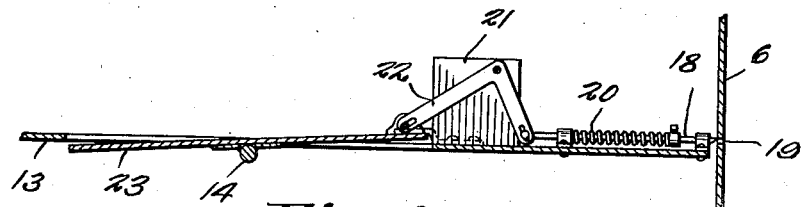
Figure 6 is a fragmental sectional view illustrating the pivoted floor of the main section, and pivoted platform, forming a part of the main floor.

Referring to the drawings in detail, the trap comprises a body portion preferably rectangular in formation, and constructed of sheet metal material.

The body portion includes side walls 5, end walls 6, bottom 7 and hinged cover 8. The reference character 9 designates a vertical partition disposed within the body portion, dividing the body portion into a main section 10 and a retaining section 11, the retaining section 11 having a floor 12 which is elevated from the bottom 7, so that the floor 12 is in a plane with the pivoted floor 13 of the main section of the trap.

The pivoted floor 13 is mounted on the shaft 14 disposed intermediate the ends of the body portion, and is provided with a closure 15 that extends upwardly therefrom, the closure being arranged to close the opening 16, between the main section and retaining section of the trap, when the trap is in its set position. Pivoted rods 17 are mounted adjacent to the opening 16 and swing inwardly, so that rodents passing through the opening 16 may enter the retaining section of the trap, but will be prevented from returning through said opening.

The pivoted floor section 13 is normally held in its set or horizontal position, by means of the sliding bolt 18 which extends into the opening 19 formed in one end wall of the body portion. A spring 20 surrounds the sliding bolt 18, and normally acts to urge the bolt 18 into the opening.

Rising from the pivoted platform are spaced plates 21 between which the bell-crank lever 22 is pivotally mounted, one end of the bell-crank lever 22 being connected with one end of the sliding bolt 18, while the opposite end of the bell-crank lever has pivotal connection with the pivoted platform 23 which is also pivotally mounted on the shaft 14.

Figure 3:
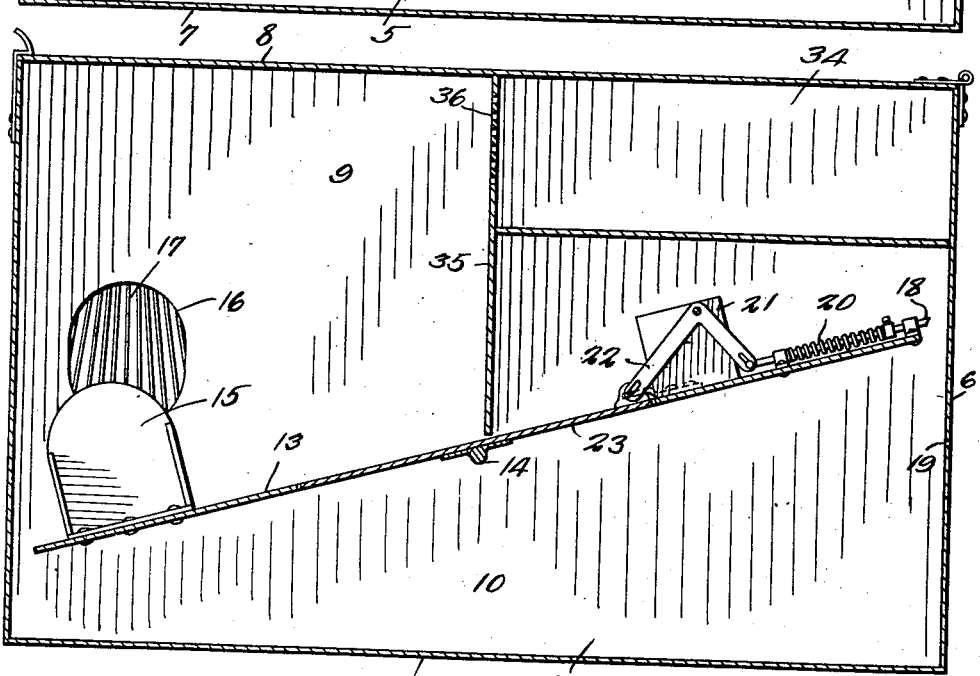
Figure 3 is a sectional view taken on line 3—3 of Figure 1.

Stops 24 are secured to the pivoted floor 13 at a point adjacent to one end of the pivoted platform 23, the stops being spaced from the pivoted platform 23, when the platform is in its normal position, so that a slight movement upwardly of the platform 23 will be permitted under the weight of a rodent passing thereon, to operate the sliding bolt 18 and release the pivoted floor section, permitting the floor section to move to a position as shown by Figure 3 of the drawings.

The entrance opening of the trap is indicated by the reference character 25, and this opening is normally closed by means of the sliding closure 26, which is mounted within the parallel guides 27 arranged adjacent to the entrance opening 25. This closure 26 is operated by means of the bell-crank lever 28 that has pivotal connection with the side wall of the body portion, at 29, one end of the bell-crank lever 28 being connected with the link 30 that in turn connects with one edge of the pivoted floor 13, at 31.

A link 32 connects the bell-crank lever 28 with the sliding closure 26, so that as the pivoted floor section 13 moves downwardly under the weight of a rodent, the sliding closure 26 will be moved to a position to close the entrance opening and thereby cut off the escape of the rodent, through the entrance opening. A platform 33 is arranged near the entrance opening of the trap, so that rodents may pass into the entrance opening of the trap, by climbing onto the platform.

A bait compartment indicated at 34 is provided within the upper portion of the trap, the front wall 35 of the bait compartment being formed with openings 36 so that odors from the bait may pass into the main portion of the trap, to attract rodents to the trap.

Figure 2:
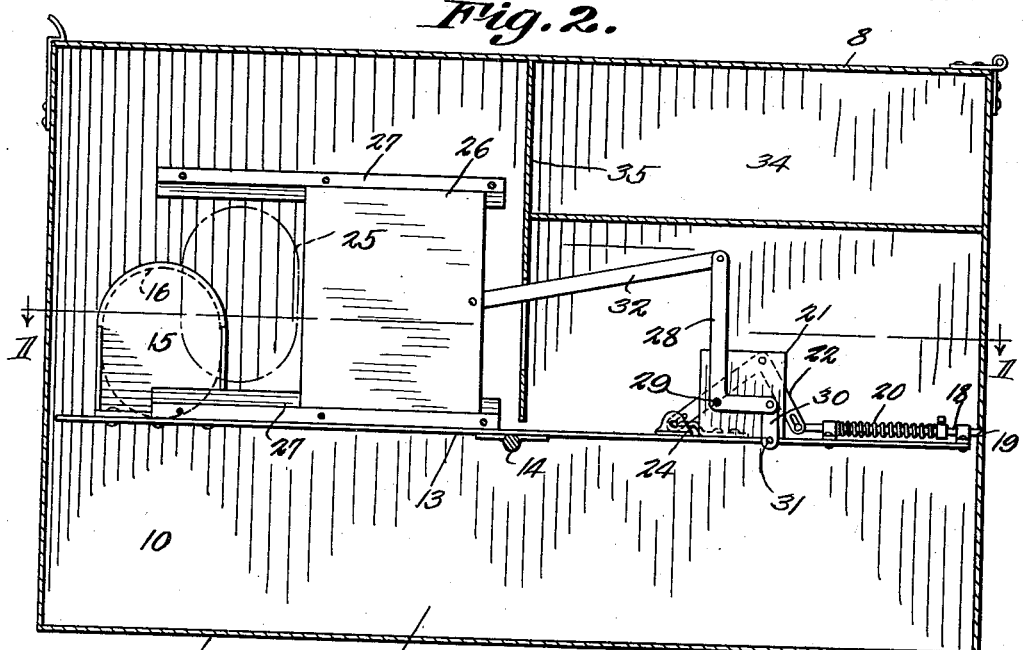
Figure 2 is a sectional view taken on line 2—2 of Figure 1.

It might be further stated, that the sliding bolt and mechanism for operating the sliding bolt is of such a weight as to normally overbalance the pivoted floor section so that when a rodent passes into the retaining section of the trap, the pivoted floor will automatically swing downwardly to its horizontal position, as shown by Figure 2. It will of course be understood that with the return of the pivoted floor section to its normal horizontal position, the sliding closure 26 is moved to again clear the entrance opening, so rodents may have free access to the interior of the trap.

In the operation of the trap, it will be obvious that rodents passing into the trap will necessarily pass onto the pivoted platform 23, in an attempt to obtain the bait. The weight of the rodent on the platform 23 will move the pivoted platform 23 operating the sliding bolt, releasing the pivoted floor section 13, which takes a position as shown by Figure 3. With this movement of the pivoted floor section, the sliding closure 26 is moved to close the entrance opening, and the closure 15 is moved downwardly, exposing the opening 16 to the retaining section of the trap. The rodent in an attempt to escape, will pass through the opening 16, whereupon the pivoted floor section will swing downwardly to its normal horizontal position. The sliding closure 26 is now moved to uncover the entrance opening of the trap, so that other rodents may pass into the trap.

What is claimed is:

In a trap of the class described, a body portion having an entrance opening, a partition dividing the body portion into a main section and a retaining section, said partition having an opening establishing communication between the sections, a pivoted platform providing the floor of the main section and having an opening formed therein, a pivoted platform normally closing the opening in the platform forming the floor of the main section, a latch member mounted on the first mentioned platform and normally holding the platform in its horizontal position, a sliding closure operating adjacent to the entrance opening, means controlled by the operation of the pivoted platform for moving the closure to its open or closed position, and a closure on the platform adapted to normally close the opening in said partition, and said latter closure adapted to move to its open position admitting a trapped rodent to the retaining section when the platform forming the floor of the main section swings downwardly under the weight of the rodent passing thereover.

LYNN LESTER LAWRENCE.